(12) United States Patent
Lauer

(10) Patent No.: US 11,470,783 B2
(45) Date of Patent: Oct. 18, 2022

(54) THRESHING OR SEPARATING CONCAVE FOR GRAIN HARVESTING

(71) Applicant: Deere & Company, Moline, IL (US)

(72) Inventor: Friedrich Lauer, Kraehenberg (DE)

(73) Assignee: Deere & Company, Moline, IL (US)

( * ) Notice: Subject to any disclaimer, the term of this patent is extended or adjusted under 35 U.S.C. 154(b) by 539 days.

(21) Appl. No.: 16/012,805

(22) Filed: Jun. 20, 2018

(65) Prior Publication Data

US 2018/0368324 A1 Dec. 27, 2018

(30) Foreign Application Priority Data

Jun. 26, 2017 (DE) .......................... 102017210710.3

(51) Int. Cl.
*A01F 12/24* (2006.01)
*A01F 12/26* (2006.01)
*A01F 7/06* (2006.01)

(52) U.S. Cl.
CPC .............. *A01F 12/24* (2013.01); *A01F 7/062* (2013.01); *A01F 12/26* (2013.01)

(58) Field of Classification Search
CPC .......... A01F 12/24; A01F 12/26; A01F 12/28; A01F 7/062
USPC .................................................. 460/107–110
See application file for complete search history.

(56) References Cited

U.S. PATENT DOCUMENTS

| | | | | |
|---|---|---|---|---|
| 3,871,384 A * | 3/1975 | Depauw | .................. | A01F 12/20 460/109 |
| 4,031,901 A * | 6/1977 | Rowland-Hill | ......... | A01F 12/24 460/108 |
| 4,078,571 A * | 3/1978 | Todd | .......................... | A01F 7/06 460/66 |
| 4,946,419 A * | 8/1990 | Cromheecke | .............. | A01F 7/06 460/122 |
| 5,145,462 A * | 9/1992 | Tanis | ...................... | A01F 12/10 460/68 |
| 6,193,604 B1 * | 2/2001 | Ramp | ...................... | A01F 12/24 460/109 |
| 6,358,142 B1 * | 3/2002 | Imel | ......................... | A01F 12/26 460/107 |
| 6,503,142 B2 * | 1/2003 | Imel | ........................ | A01F 12/26 460/107 |
| 7,001,268 B2 * | 2/2006 | Puryk | ................... | A01F 12/185 460/109 |

(Continued)

FOREIGN PATENT DOCUMENTS

DE  519105     2/1931
DE  3303413 A1  8/1984
(Continued)

OTHER PUBLICATIONS

European Search Report issued in counterpart application No. 18176563.7 dated Oct. 31, 2018. (7 pages).

*Primary Examiner* — Thomas B Will
*Assistant Examiner* — Joan D Misa

(57) ABSTRACT

A threshing or separating concave for grain harvesting is equipped with curved cheeks, between which concave bars having an elongated cross-sectional profile extend, the curved inside edges of which are provided with a rounded inside edge, and having concave rods extending in the direction of the curve, which pass through holes in the concave bars that are immediately adjacent to the rounded inside edge.

13 Claims, 4 Drawing Sheets

(56) References Cited

U.S. PATENT DOCUMENTS

| | | | | |
|---|---|---|---|---|
| 8,133,100 B2 * | 3/2012 | Regier | ............... | A01F 12/28 |
| | | | | 460/109 |
| 8,454,416 B1 * | 6/2013 | Estes | ............... | A01F 12/24 |
| | | | | 460/110 |
| D687,659 S * | 8/2013 | MacKenzie | ............... | D6/682.2 |
| 8,721,411 B2 * | 5/2014 | Reiger | ............... | A01F 12/26 |
| | | | | 460/108 |
| 9,775,296 B2 * | 10/2017 | Haus | ............... | A01F 12/24 |
| 9,913,431 B2 * | 3/2018 | Van Hullebusch | ... | A01F 12/185 |
| 10,412,895 B2 * | 9/2019 | Theisen | ............... | A01F 12/26 |
| 10,779,474 B2 * | 9/2020 | Ritter | ............... | A01F 12/26 |
| 2006/0019731 A1 * | 1/2006 | Ricketts | ............... | A01F 12/26 |
| | | | | 460/108 |
| 2007/0026913 A1 * | 2/2007 | Kuchar | ............... | A01F 12/22 |
| | | | | 460/112 |
| 2009/0197655 A1 * | 8/2009 | Ellingson | ............... | A01F 12/20 |
| | | | | 460/71 |
| 2015/0017394 A1 * | 1/2015 | Johnson | ............... | B65G 33/265 |
| | | | | 428/192 |

FOREIGN PATENT DOCUMENTS

| | | |
|---|---|---|
| DE | 10027450 A1 | 1/2002 |
| DE | 102012210649 A1 | 12/2013 |
| DE | 202017102477 U1 | 5/2017 |
| EP | 3028560 A1 | 6/2016 |
| EP | 3103322 A1 | 12/2016 |
| FR | 2612216 A1 | 9/1988 |
| FR | 2621216 A1 | 4/1989 |

\* cited by examiner

THRESHING OR SEPARATING CONCAVE FOR GRAIN HARVESTING

FIELD OF THE INVENTION

The invention concerns a threshing or separating concave for grain harvesting, with curved cheeks, between which there extend bars having an elongated cross-sectional profile ("concave bars" hereinafter), the curved inside edges of which are rounded, and rods that pass through holes in the concave bars and extend in the direction of the curve ("concave rods" hereinafter), a threshing system, and a combine with such a threshing or separating concave.

BACKGROUND OF THE INVENTION

Agricultural combine harvesters are large machines that harvest, thresh, separate, and clean the agriculturally grown crop, which bears grain. The resulting clean grain is stored in a grain tank disposed on the combine harvester. As a rule, tangential threshing systems with a threshing concave and a threshing drum tangentially transporting the crop, or axial threshing systems that axially transport the crop, with axial threshing rotors, which likewise interact with a threshing concave, serve for threshing. The threshing concave surrounds the threshing drum or the axial threshing rotor over a part of its circumference and with it forms a gap, through which the crop to be threshed is forced. As the crop is transported through the gap, desirable parts of the crop (the grain) separate, fall through interstices, and are sent to a cleaning system. Similarly, the crop, after threshing, can be processed by means of a tangentially operating separating drum, or a rear segment of an axial threshing system, or a separating rotor disposed downstream of a tangential threshing drum and a separating concave that interacts therewith, so as to release remaining grain from the crop mat.

The threshing concaves are usually composed of outer cheeks that extend in the circumferential direction of the threshing drum and curved bars disposed in parallel between the cheeks, as well as axial concave bars that are perpendicular thereto, leaving spaces between, in which there are concave rods oriented parallel to the curved bars. The concave rods pass through holes (drillings) in the concave bars. The concave bars have rectangular cross sections.

For example, DE 100 27 450 A1 shows a threshing concave of the said type for grain harvesting that has rectangular axial concave bars and round tangential concave rods.

DE 33 03 413 A1 shows a threshing concave for corn harvesting with concave bars having a round cross section.

A different threshing concave, which can be used both for corn harvesting and grain harvesting is shown in FR 2 621 216 A1. It comprises round, cylindrical concave bars, which are joined to perforated plates at the downstream end. The concave bars can be rotated about their lengthwise axes, so that the plates can be folded under for corn harvesting and brought into a tangential orientation for grain harvesting.

Finally, DE 519 105 A shows a threshing concave for rasp bar threshing machines having concave bars disposed at an angle to the direction of ejection of the threshed grain. The edge regions of the concave bars that are turned toward the threshing drum are wedge-shaped and comprise a rounded, inner edge. Concave rods running in the circumferential direction, which serve for mechanical securing of the concave bars and which have a relatively large spacing from the inner edges of the concave bars, can be used.

In the prior art, concave bars that extend axially, perpendicular to the direction of material flow, usually have a rectangular cross section in the case of threshing concaves for grain harvesting and accordingly have flat surfaces running in the direction of the crop flow in order to provide an aggressive threshing action. The separating concaves as a rule are usually provided with rectangular cross section concave bars (DE 10 2012 210 649 A1). The rectangular concave bars, in combination with the concave rods that are arranged at a relatively large distance thereunder, result in the concave bars producing a relatively high resistance to crop flow. Because of this, the crop mat moves relatively slowly along the threshing gap, which does not always lead to a satisfactory separating action of the threshing or separating concave. Moreover, the rectangular concave bars damage the straw.

The above-mentioned threshing concave per DE 33 03 413 A1 is explicitly not suitable for harvesting of grain, i.e., smaller grains, which one can also recognize from the lack of axially extending concave rods. The round shape of the concave bars per FR 2 621 216 A1 is likewise because the said threshing concave is also intended to be used for corn; moreover, it does not have concave rods, since their function is taken on by the perforated plates. The round profile of the concave bars per DE 33 03 413 A1 and FR 2 621 216 A1 further has the disadvantage that the said concave bars must have a relatively large diameter to be sufficiently stable, which, however, degrades the threshing effect for grains.

Also, the threshing concave per DE 519 105 A cannot satisfactorily solve the problem that the concave bars produce a relatively high resistance to crop flow, since in that concave the concave rods are disposed at a large distance from the inner edges of the concave bars.

The problem underlying the invention is seen in making available a threshing or separating concave, a threshing system, and a combine harvester with said threshing or separating concave, which does not have the said disadvantages or has them to a lesser extent.

SUMMARY OF THE INVENTION

A threshing or separating concave suitable for grain harvesting (i.e., for harvesting small grains like wheat, barley, rye, spelt, etc.) is equipped with curved cheeks, the curvature of which is matched to the radius of the threshing or separating drum with which the threshing or separating concave is to be used. Concave bars having an elongated cross-sectional profile extend between the cheeks, either perpendicular to the cheeks or at an obtuse angle thereto. The edges of the concave bars that are inside the curve (i.e., next to the threshing or separating drum) are rounded. Concave rods extending in the direction of the curve pass through holes in the concave bars, which are immediately adjacent to the rounded inside edge of the concave bars.

The disadvantages of the prior art mentioned at the start are avoided in this way. The resistance of the concave surface to the straw mat, which moves between the concave surface and the threshing or separating drum, is correspondingly reduced through the concave bars that are rounded on the inside of the curve in combination with the high concave rods which are immediately adjacent to the inside edges of the concave bars. Because of this, the material speed increases by comparison with a traditional threshing or separating concave for the same drum speed, as a consequence of the lower resistance. This results in better separation. The rounded concave bars also have a favorable effect on the straw quality. Concave bars having an elongated cross-sectional profile are more stable then cylindrical concave bars.

The rounded inside edges of the concave bars can immediately follow the holes of the concave bars on the inside of the curve.

The concave rods can run parallel to the cheeks or at an acute angle to the cheeks and/or transversely to the concave bars or at an obtuse angle thereto.

The radius of the rounded edges of the concave bars (seen from the rounded edges) can correspond to half of the thickness of concave bars that have a rectangular cross-sectional profile measured in the direction of the curve.

The threshing or separating concave can be used in a threshing system, in particular a tangential threshing system, which is equipped with a threshing drum or a tangential separator and the threshing or separating concave that interacts therewith. However, an axial threshing and/or separator rotor could also be used.

BRIEF DESCRIPTION OF THE DRAWINGS

An embodiment example of the invention, which is described in more detail below, is shown in the drawings, where the reference numbers are not to be employed for a limiting interpretation.

DETAILED DESCRIPTION OF THE PREFERRED EMBODIMENTS

Figure 1:
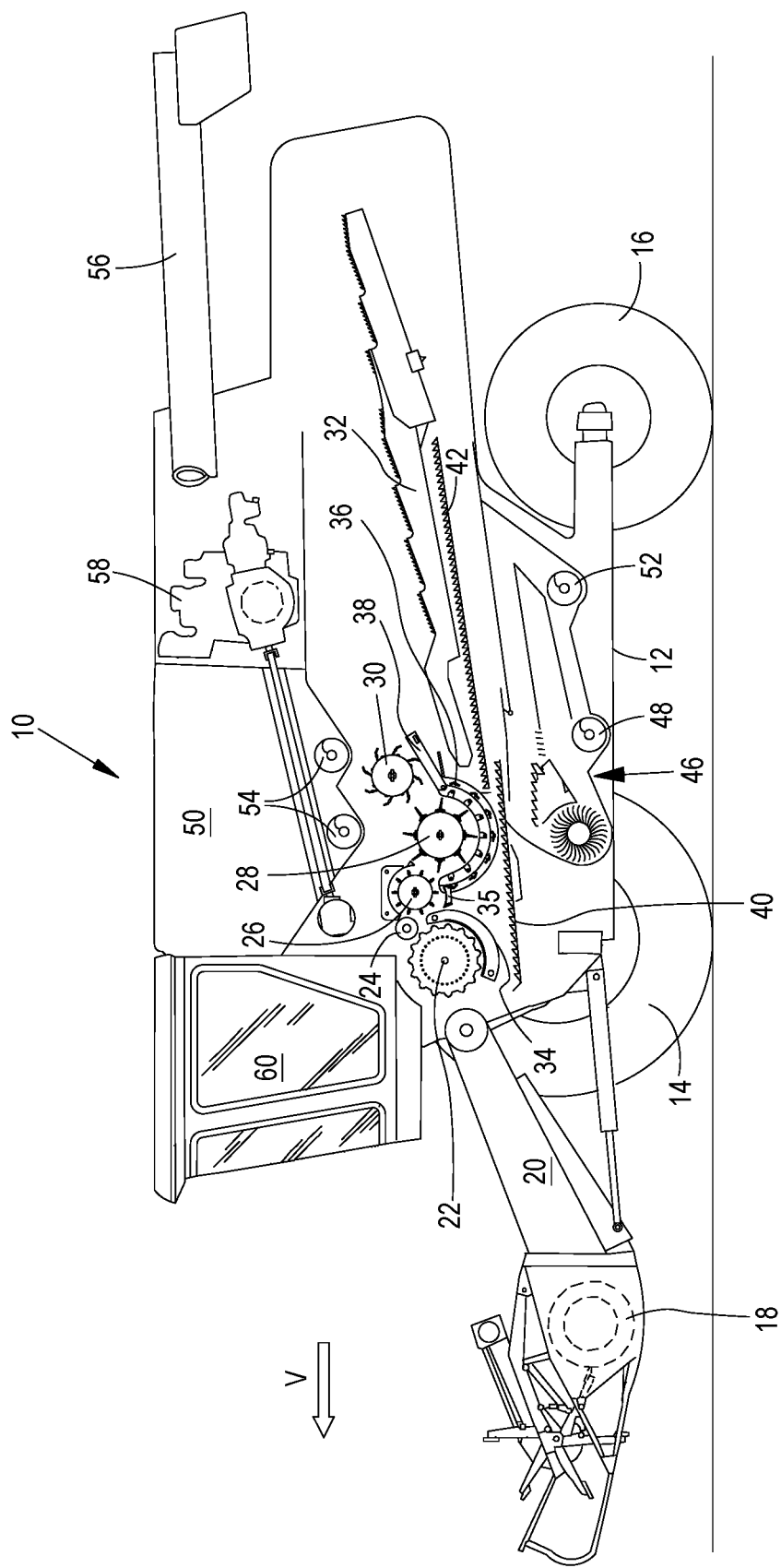
FIG. 1 shows a schematic side view of a combine harvester with a multi-drum threshing system.

FIG. 1 shows a self-propelled combine harvester 10 with a chassis 12, which is supported on the ground by driven front wheels 14 and steerable rear wheels 16 and is moved forward by said wheels. The wheels 14 are put into rotation by means of a drive means (not shown), to move the combine thresher 10, for example, over a field that is to be harvested. In the discussion below, directional data such as "forward" and "backward" refer to the direction of travel "V" of the combine thresher 10 in harvesting operation.

A crop head 18 in the form of a cutter system is removably attached to the front end of the combine thresher 10 so as to remove crop in the form of grain from the field during harvesting operation and to deliver it upward and to the rear through an inclined grain conveyor 20 of a multi-drum threshing system comprising a threshing drum 22, a separator drum 24, an overshot transport drum 26, a tangential separator 28, and a turning drum 30, arranged one behind the other in the direction of travel V. A straw walker 32 is located downstream from the turning drum 30. The lower and rearward region of threshing drum 22 is surrounded by a threshing concave 34. A perforated or closed tray 44 is disposed underneath the transport drum 26, while a fixed tray is situated above the transport drum 26 and a separating concave 36 is situated below the tangential separator 28. Underneath the turning drum 30 there is a finger rake 38, which could be omitted.

The mixture containing grains and contaminants passing through the threshing concave 34, the separating concave 36, and the straw walker 32 goes to a cleaning system 46 via transport trays 40, 42. Grain cleaned by the cleaning system 46 is sent by means of a grain auger 48 to an elevator (not shown), which transports it to a grain tank 50. A returns auger 52 sends underthreshed crop back through another elevator (not shown) to the threshing process. The chaff can be discharged at the rear of the sieve by a spinning chaff spreader, or it can be handled by a straw chopper (not shown) disposed downstream from the straw walker 32. The cleaned grain can be discharged from the grain tank 50 by a discharge system with cross augers 54 and a discharge conveyor 56.

The said systems are driven by means of an internal combustion engine 58 and controlled and steered by an operator from an operator cab 60. The various systems for threshing, transport, cleaning, and separating are situated within the chassis 12. Outside the chassis 12 there is an outer shell, which is mostly hinged. It still must be noted that the multi-drum threshing system shown here is only an embodiment example. It could be replaced by a single transversely disposed threshing drum and a subsequent threshing system with the straw walker or one or more separator rotors.

Figure 2:
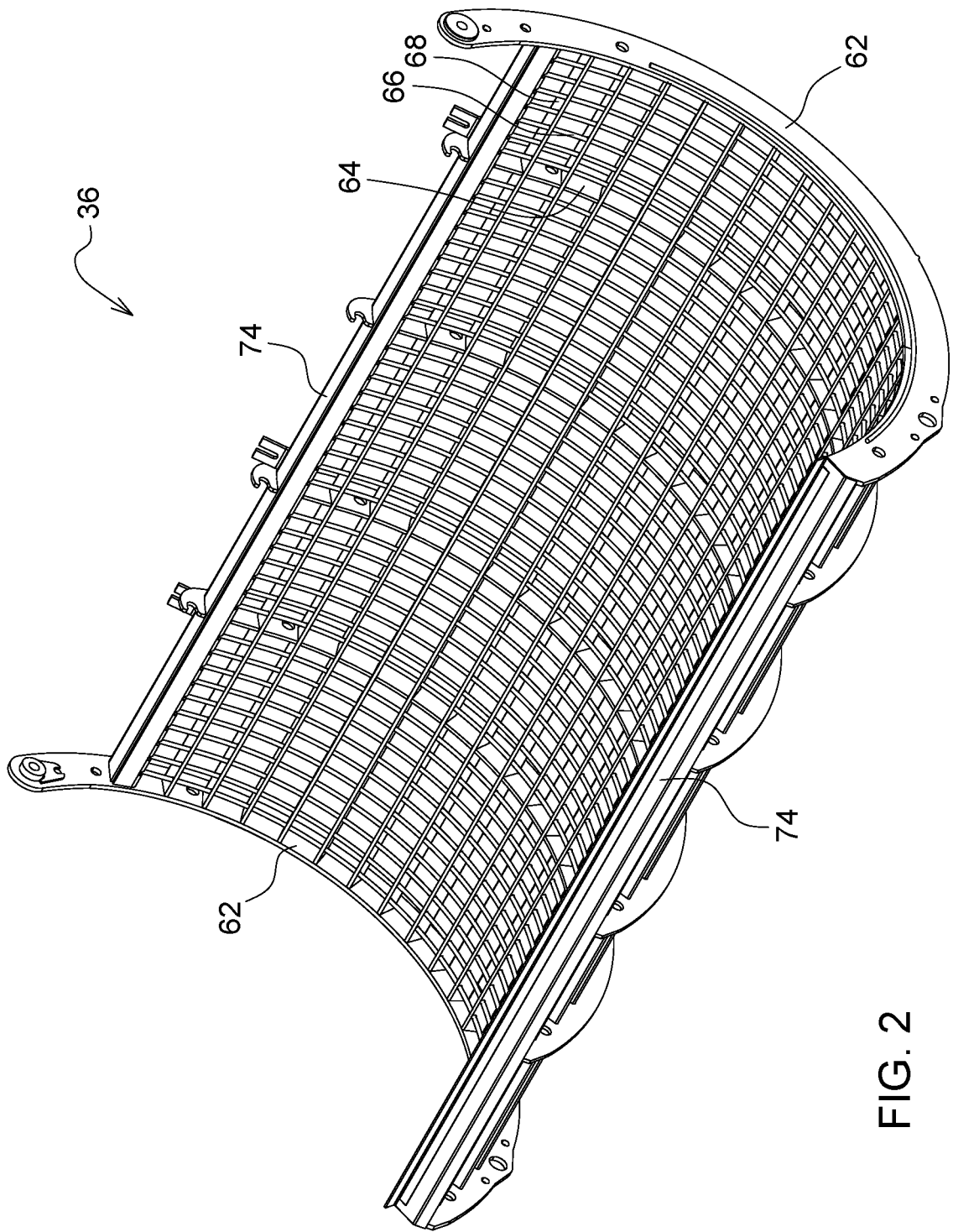
FIG. 2 shows a perspective view of the separator concave of the tangential threshing system of the combine harvester in FIG. 1.

FIG. 2 shows a perspective view of the separating concave 36 from the front and above at an angle. This concave or a similar separating concave 36 could also be used as a threshing concave 34. The separating concave 36, which is concavely shaped in the direction of material flow, comprises lateral, curved cheeks 62, which are oriented parallel to each other and are spaced apart from each other. Curved bars 64, which likewise are oriented parallel to each other and to the cheeks 62 and are spaced apart from each other, are distributed between the cheeks 62, which are connected at the ends by cross members 74. Perpendicular to the cheeks 62 and curved bars 64, i.e., extending in the axial direction of the separating concave 36, there are concave bars 68. The direction of flow of the crop in FIG. 2 is from bottom left to top right. The cheeks 62 and the curved bars 64 together with the concave bars 68, which are firmly mounted on the threshing concave, form a supporting structure for the separating concave 36. Directional data concerning the separating concave 36 such as tangential, axial and radial, refer to the tangential separator 28 and the axis of symmetry of the concavely curved separating concave 36, which coincides with its radius. The direction of material flow corresponds to the (tangential) circumferential direction of the tangential separator 28 and the separating concave 36.

Figure 3:
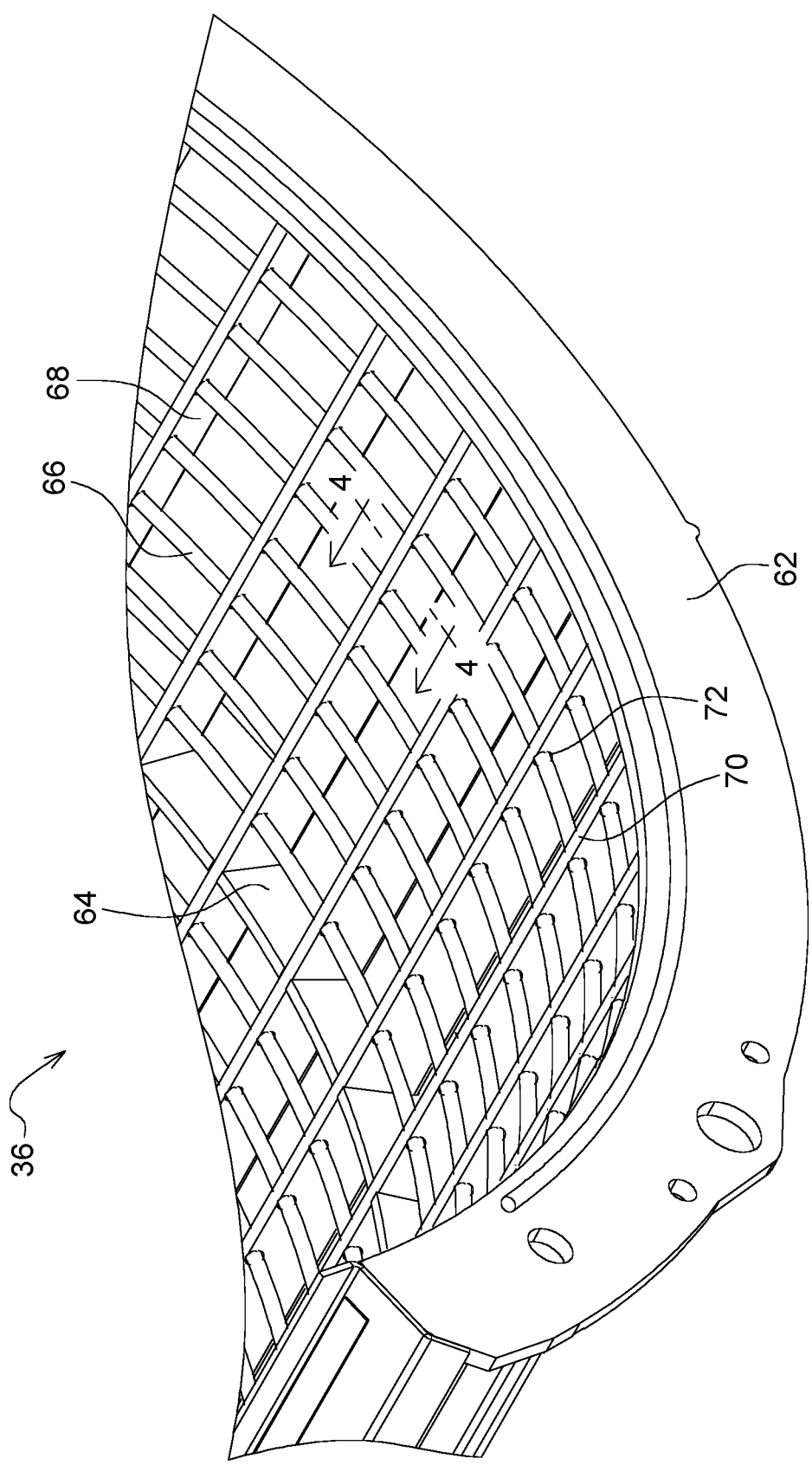
FIG. 3 shows an enlarged segment from FIG. 2.
Figure 4:
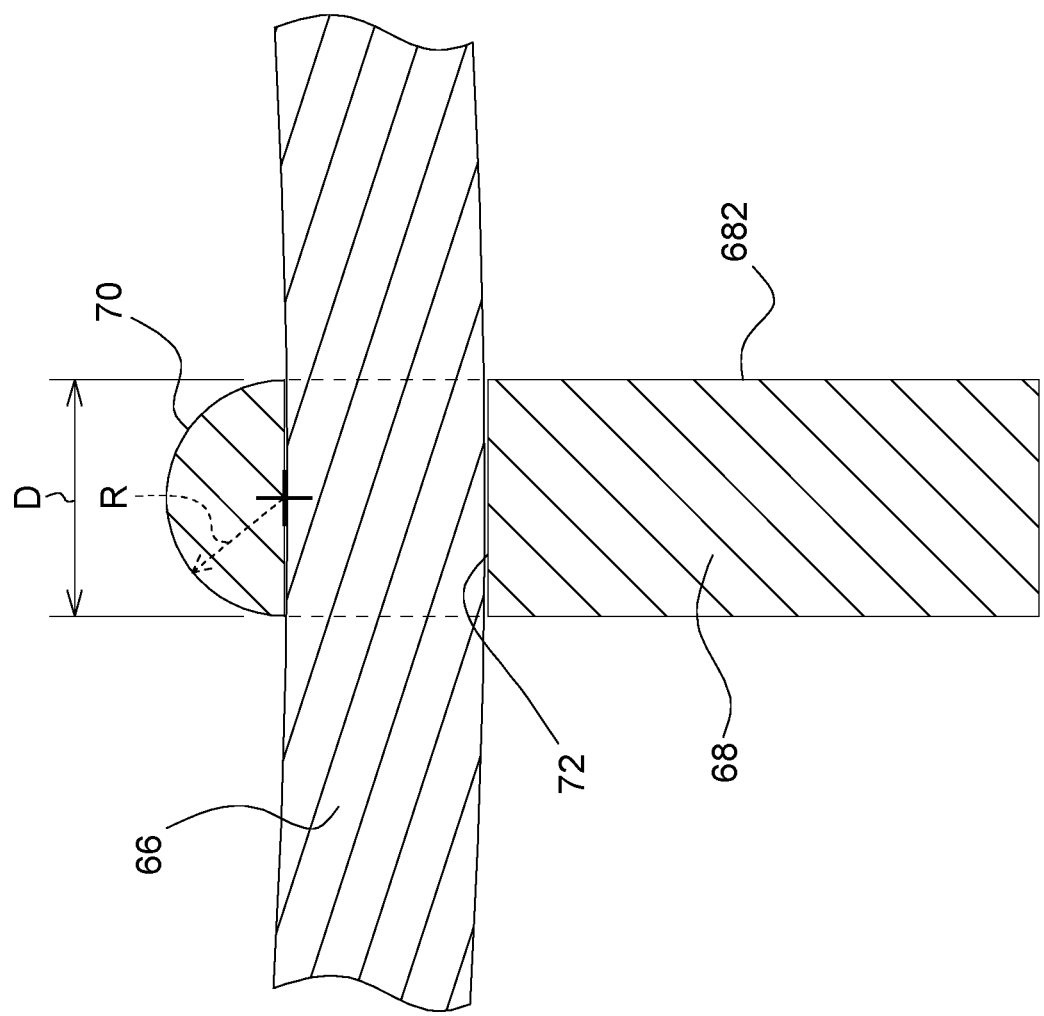
FIG. 4 shows an enlarged section of the concave bar of FIG. 3.

Concave rods 66, which are passed through holes 72 (drillings) in the concave bars 68, as one can best see by means of FIG. 3, extend parallel to the cheeks 62 and the curved bars 64.

The concave bars 68 have, in a substantially known way, a rectangular cross-sectional profile 682, whose longer dimension extends approximately radially to the tangential separator 28, but optionally could also be bent around the lengthwise axis of the concave bars 68 in the direction of rotation of the tangential separator 28 or against it. At the curved inner edges (i.e., next to the tangential separator 28) the concave bars 68, on the other hand, are provided with a semicircular rounded inside edge 70, the radius R of which corresponds to half the dimension D (thickness) of the concave bars 68 measured in the tangential direction (i.e., the shorter dimension of the rectangular cross-sectional profile of the concave bars 68). Accordingly, at the inner edge the concave bars 68 transition into the rounded inside edge 70 without a ledge or step. It would be conceivable to leave off the half of the rounded inside edge 70 that is to the rear of the crop flow, i.e., to provide a right angle there. The inside (upper) edges of the holes 72 are situated exactly where the flat regions of the concave bars 68 transition to the rounded inside edge 70.

The separating concave 36 thus has a relatively smooth surface due to the rounded inside edges 70 and holes 72 for the concave rods that are immediately adjacent thereto, the surface now offering only a little mechanical resistance to the crop flow, which improves the separating action of the separating concave 76.

The invention claimed is:

1. A threshing or separating concave for grain harvesting, having curved cheeks, between which concave bars having an elongated cross-sectional profile with a rounded inside edge extend, and having concave rods that extend in the same direction as the curved cheeks and extend through holes in the concave bars, wherein the holes are immediately adjacent to the rounded inside edge.

2. The threshing or separating concave as in claim 1, where the rounded inside edges transition directly to the holes.

3. The threshing or separating concave as in claim 2, where the concave bars extend perpendicular to the curved cheeks or at an acute angle thereto.

4. The threshing or separating concave as in claim 2, where the concave rods extend parallel to the curved cheeks or at an acute angle to the curved cheeks and/or perpendicular to the concave bars or at an obtuse angle thereto.

5. The threshing or separating concave as in claim 2, where the radius of the rounded inside edges corresponds to half of the thickness, measured in the direction of the curve of concave bars that have a rectangular cross-sectional profile.

6. The threshing or separating concave as in claim 1, where the concave bars extend perpendicular to the curved cheeks or at an acute angle thereto.

7. The threshing or separating concave as in claim 6, where the concave rods extend parallel to the curved cheeks or at an acute angle to the curved cheeks and/or perpendicular to the concave bars or at an obtuse angle thereto.

8. The threshing or separating concave as in claim 6, where the radius of the rounded inside edges corresponds to half of the thickness, measured in the direction of the curve of concave bars that have a rectangular cross-sectional profile.

9. The threshing or separating concave as in claim 1, where the concave rods extend parallel to the curved cheeks or at an acute angle to the cheeks and/or perpendicular to the concave bars or at an obtuse angle thereto.

10. The threshing or separating concave as in claim 9, where the radius of the rounded inside edges corresponds to half of the thickness, measured in the direction of the curve of concave bars that have a rectangular cross-sectional profile.

11. The threshing or separating concave as in claim 1, where the radius of the rounded inside edges corresponds to half of the thickness, measured in the direction of the curve of concave bars that have a rectangular cross-sectional profile.

12. A threshing system, having a threshing drum or a tangential separator and a threshing or separating concave interacting therewith as in claim 1.

13. A combine harvester with a threshing system as in claim 12.

* * * * *